US012800283B2

(12) United States Patent
Wegner

(10) Patent No.: US 12,800,283 B2
(45) Date of Patent: Nov. 17, 2026

(54) CONTOUR GAUGE

(71) Applicant: wolfcraft GmbH, Kempenich (DE)

(72) Inventor: Christian Wegner, Cologne (DE)

(73) Assignee: wolfcraft GmbH, Kempenich (DE)

( * ) Notice: Subject to any disclaimer, the term of this patent is extended or adjusted under 35 U.S.C. 154(b) by 352 days.

(21) Appl. No.: 18/717,025

(22) PCT Filed: Dec. 8, 2022

(86) PCT No.: PCT/EP2022/084984
§ 371 (c)(1),
(2) Date: Jun. 6, 2024

(87) PCT Pub. No.: WO2023/104967
PCT Pub. Date: Jun. 15, 2023

(65) Prior Publication Data

US 2025/0035421 A1 Jan. 30, 2025

(30) Foreign Application Priority Data

Dec. 10, 2021 (DE) ..................... 10 2021 132 710.5
Aug. 23, 2022 (DE) ..................... 10 2022 121 278.5

(51) Int. Cl.
*G01B 5/20* (2006.01)
*G01B 3/08* (2006.01)

(52) U.S. Cl.
CPC ................. *G01B 5/20* (2013.01); *G01B 3/08* (2013.01)

(58) Field of Classification Search
CPC ............. G01B 5/20; G01B 3/08; G01B 5/207
See application file for complete search history.

(56) References Cited

U.S. PATENT DOCUMENTS 2,022,628 A 11/1935 Whitney
4,388,761 A * 6/1983 Henderson ............ B43L 13/028 33/42

(Continued)

FOREIGN PATENT DOCUMENTS

AT 19553 B 3/1905
CH 264674 A 10/1949

(Continued)

OTHER PUBLICATIONS

International Search Report of PCT/EP2022/084984, mailed Jun. 1, 2023.

*Primary Examiner* — Yaritza Guadalupe-Mccall
(74) *Attorney, Agent, or Firm* — Collard & Roe, P.C.

(57) ABSTRACT

A contour gauge has an elongated housing, in which a plurality of measuring teeth are arranged so as to move transverse to the extension direction of the housing, and a ruler assembly for measuring a distance to an object spaced apart from the housing in the extension direction of the housing. The ruler assembly has a first ruler which is guided on lateral walls of a guide of the housing, which can be pulled out of the guide from a first storage position within the guide into a first stop position in the extension direction of the housing, and which supports a second ruler which can be moved relative to the first ruler in the extension direction of the housing from a second storage position into a second stop position. Securing elements are provided with which the rulers can be secured to the housing or to one another.

10 Claims, 12 Drawing Sheets

(56) References Cited

U.S. PATENT DOCUMENTS 4,451,993 A * 6/1984 Yauk ........................ G01B 3/02 33/495
5,131,257 A * 7/1992 Mingardi ............. B25H 1/0007 72/457
5,546,668 A * 8/1996 Ahdoot .................. G01B 5/207 33/561.1
6,085,434 A * 7/2000 Mitchell .................. G01B 3/08 33/295
6,598,308 B1 * 7/2003 Johansson .............. G01B 5/207 33/608
7,082,692 B2 * 8/2006 Shapiro .................... G01B 3/04 33/473
7,117,610 B2 * 10/2006 Bailey ..................... E04F 21/20 33/561.1
7,493,704 B2 * 2/2009 Bailey ................. E04F 21/0076 33/561.1
8,250,771 B2 * 8/2012 Pinal ..................... B43L 13/002 33/473
8,272,136 B2 * 9/2012 Vogeler ................... B43L 9/007 30/286
9,404,726 B2 * 8/2016 Shu ........................ G01B 5/207
10,495,434 B1 * 12/2019 Motz ........................ G01B 3/20
10,775,146 B1 * 9/2020 Moss ....................... G01C 1/00
11,781,850 B1 * 10/2023 Marshall .................. G01B 5/14 33/301
D1,071,751 S * 4/2025 Wegner .......................... D10/65
12,558,773 B2 * 2/2026 Ashcraft ................ B25H 7/045
2012/0266472 A1 * 10/2012 Liza .................... E04F 21/0076 33/527
2014/0345749 A1 * 11/2014 Davey ..................... B27C 5/003 144/144.51
2015/0377601 A1 * 12/2015 Shu ........................ G01B 5/207 33/561.1
2016/0002935 A1 * 1/2016 Saravanos ........... E04F 21/0076 33/527
2025/0035421 A1 * 1/2025 Wegner .................. G01B 5/207
2025/0065488 A1 * 2/2025 Ashcraft ................ B25H 7/045

FOREIGN PATENT DOCUMENTS

CN 211552691 U * 9/2020
CN 113237401 A * 8/2021 ............... G01B 3/08
CN 215338026 U * 12/2021
DE 20 2014 105 871 U1 12/2014
DE 10 2013 019 502 A1 5/2015
DE 202018002027 U1 * 5/2018 ............... G01B 3/08
EP 2 016 364 B1 1/2012
FR 338625 A 5/1904
GB 931463 A 7/1963
WO WO-9843040 A1 * 10/1998 ............. G01B 5/207

* cited by examiner

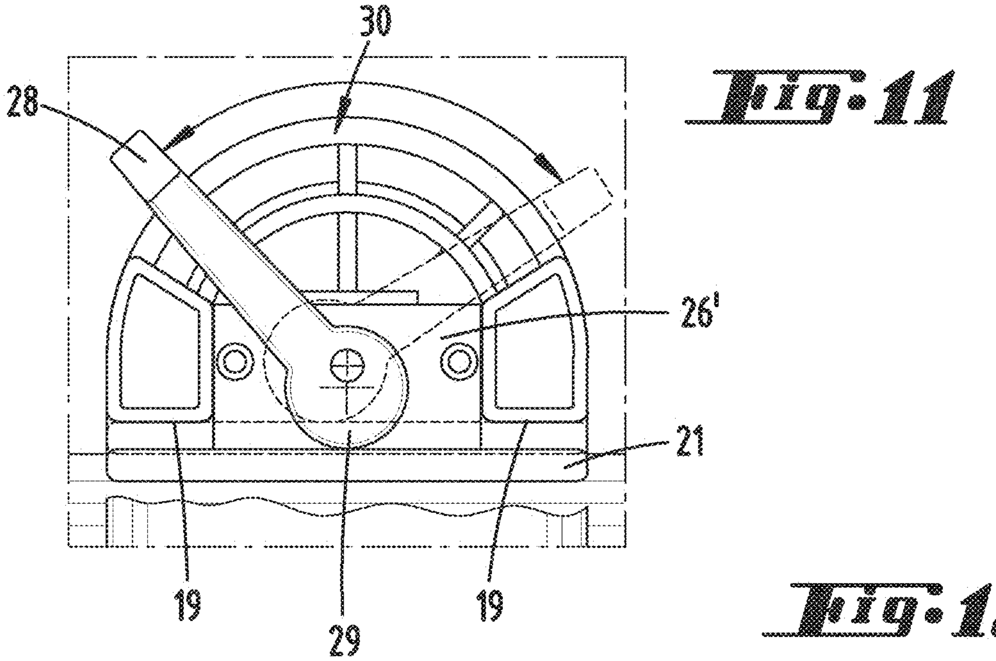
Fig. 11
Fig. 12
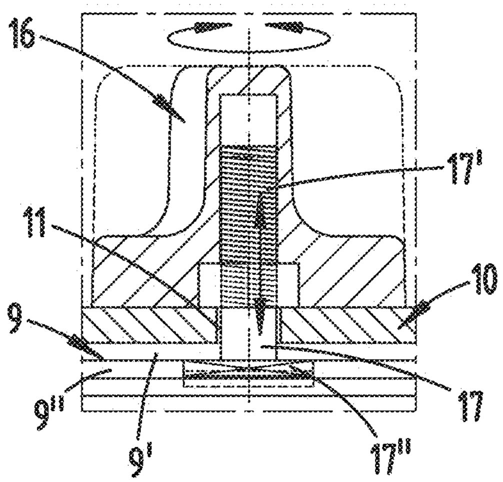
Fig. 13
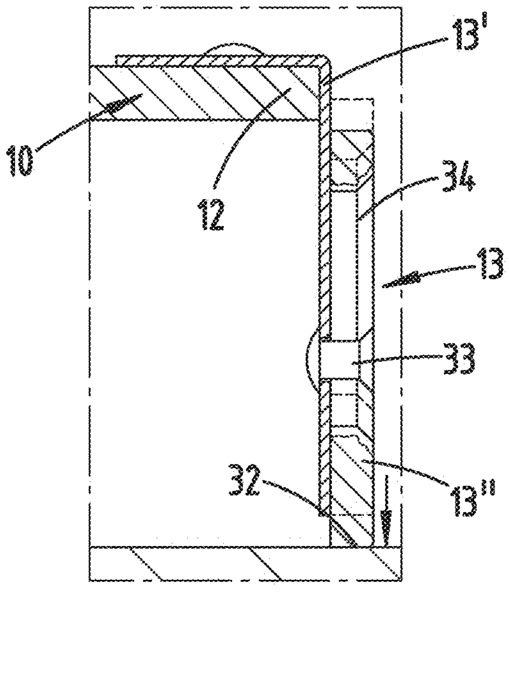

CONTOUR GAUGE

CROSS REFERENCE TO RELATED APPLICATIONS

This application is the National Stage of PCT/EP2022/084984 filed on Dec. 8, 2022, which claims priority under 35 U.S.C. § 119 of German Application No. 10 2021 132 710.5 filed on Dec. 10, 2021 and German Application No. 10 2022 121 278.5 filed on Aug. 23, 2022, the disclosures of which are incorporated by reference. The international application under PCT article 21(2) was not published in English.

FIELD OF TECHNOLOGY

The invention relates to contour gauge comprising an elongated housing, in which a plurality of feeler fins are arranged, which can be displaced transversely to the direction of extension of the housing and comprising a ruler assembly for tapping a distance to an object spaced apart from the housing in the direction of the extension of the latter, wherein the ruler assembly has a first ruler, which is guided on side walls of a guide of the housing, which can be pulled out of the guide from a first storage position within the guide all the way into a first stop position in the direction of extension of the housing, and which carries a second ruler, which can be displaced with respect to the first ruler from a second storage position all the way into a second stop position in the direction of extension of the housing.

The invention furthermore relates to a contour gauge comprising an elongated housing, in which a plurality of feeler fins are arranged, which can be displaced transversely to the direction of extension of the housing and which are arranged so as to adjoin one another with contact in a housing cavity of the housing so as to form a fin bundle, wherein a first pressure plate engages with a first feeler fin arranged on the edge of the fin bundle, and a second pressure plate engages with a feeler fin arranged on the second edge of the fin bundle, and a clamping element is provided, by means of which a force directed at the fin bundle can be exerted on the first pressure plate.

PRIOR ART

A known contour gauge has an elongated housing comprising a housing cavity, in which a fin bundle consisting of a plurality of feeler fins is located. The feeler fins adjoin one another with contact with their broadside surfaces and can be pulled out of the housing cavity continuously in a direction transversely to the direction of extension of the housing. The respective ends of the feeler fins form feeler ends, by means of which a contour can be tapped. The known contour gauge can be used for installing floor coverings, in particular floor plates, in order to tap the contour of protrusions, which engage with the room, on the floor of which the floor covering is to be installed. The known contour gauge has a ruler assembly consisting of two rulers, by means of which the distance of the housing to an already installed base plate of the floor covering can be tapped. In a storage position, the two rulers lie within a guide of the housing and can be telescopically pulled out of this storage position. A clamping element comprising an eccentric is provided to fix the feeler fins in a position, in which the contour of the object was tapped.

The WO 98/43040 A1 discloses a contour gauge, in the case of which shiftable “rulers” are arranged on a central ruler so as to extend at distances transversely to the direction of extension thereof.

The CN 113237401 A describes a ruler consisting of two shiftable individual parts, wherein the individual parts are coupled to one another via a dovetail joint. The upper part has an opening, through which the threaded shaft of a screw protrudes, which can be screwed into a square nut. The square nut acts as clamping block thereby. The rulers can be fixed to one another in the different shifting positions.

The CN 211 552 691 U discloses a contour gauge comprising a plurality of feeler fins forming a fin bundle, which are arranged transversely to the direction of extension of an elongated housing. A pressure element in each case engages with the two ends of the fin bundle. A clamping element, by means of which the feeler fins of the fin bundle can be clamped between the two pressure plates acts against one of the pressure elements. The distance between the two pressure elements can be adjusted by means of several adjusting screws on the side of one of the two pressure elements. The adjusting screws engage with an internal thread assigned to the housing thereby.

The US 2014/345749 A1 discloses a device for routers for profiling the end of an elongated workpiece. A fin bundle having a plurality of feeler fins adjoining one another with contact is arranged between two pressure plates. A clamping element, by means of which the feeler fins can be clamped between the two pressure places, can act against one of the two pressure plates. A setting means, by means of which the distance between the pressure plates can be adjusted, is provided on the respective other pressure plate.

Further contour gauges are known, for example, from the FR 338625, GB 931463, U.S. Pat. Nos. 2,022,628, 9,404,726 B2, US 2012/0266472 A1, AT 19553, CH 264674, EP 2016364 B1, DE 20 2014 105 871 U1 and DE 10 2013 019 502 A1.

SUMMARY OF THE INVENTION

The invention is based on the object of improving the above-described contour gauge in a manner, which is advantageous for its use.

The object is solved by means of the invention specified in the claims, whereby the subclaims are not only advantageous further developments of the invention specified in the independent claims, but also represent independent solutions of the object.

According to a first aspect of the invention, the robustness of the means for tapping the distance of the free end of the second ruler to an object is to be increased. For this purpose, a contour gauge comprising an elongated housing is proposed, in which a plurality of feeler fins are arranged, which can be displaced transversely to the direction of extension of the housing. A guide, in which a ruler assembly consisting of two or more rulers is arranged, is located on the back of the housing. The several rulers can have the same width and can be mounted in the guide so as to lie one on top of the other with their broadside surfaces. The guide can have side walls, which the narrow edges of both rulers can adjoin. The several or both rulers are thereby guided in a linear direction in a common guide. The first ruler can be pulled out of the guide from a storage position, in which it lies completely in the guide, all the way into a first stop position. The first ruler carries a second ruler, which is entrained by the first ruler in response to the displacement of the first ruler. The second ruler can be displaced from a storage position, in which it bears almost congruently on the first ruler, all the way into a second stop position with respect to the first ruler. As in the case of the prior art, the two rulers can thus be telescopically pulled out of the housing in a direction transversely to the displacement direction in the feeler fins. The second ruler can carry a third ruler. According to the invention, restraining means are provided, by means of which the position of the rulers can be fixed. The rulers are generally not pulled out of the guide of the housing all the way into the stop position, but only all the way into an intermediate position, in which a stop assigned to the free end of the second ruler abuts against an object, for example against an already installed base plate. In this position, the contour of an object protruding into the room, on the floor of which base plates are to be installed, is tapped. After the feeler fins have been shifted in such a way that their position corresponds to the contour of the object, the contour gauge is used to cut out a cut-out, which corresponds to the contour of the object, at a base plate, which is to be installed there. This cut-out has to have a correct distance from the edge of the base plate, which is to be installed there. This distance is determined by means of the ruler assembly. The restraining means according to the invention are provided so that this distance is maintained and does not change during the handling with the contour gauge. The first ruler can be fixed in a least one intermediate position between the first storage position and the first stop position with respect to the housing by means of a first restraining means. The second ruler can be fixed in at least one intermediate position between the second storage position and the second stop position with respect to the first ruler by means of the second restraining means. The guide can be an elongated depression, which is open to the top and which faces the back of a housing. The housing can consist of two housing parts, an upper housing part and a lower housing part. The lower housing part forms the bottom of the housing, with which the housing can be placed onto a surface. A housing cavity, in which the feeler fins lie so as to be capable of being shifted, is located between the upper housing part and the lower housing part. The guide has an essentially elongated layout comprising two long side walls, which can be adjoined by the outer edges of the two rulers. A narrow side of the guide can be closed. The narrow side of the guide lying opposite thereto is open, in contrast, so that the rulers can be pushed out through the opening formed in this way. The guide can have a bottom. The bottom can extend in a plane. The bottom can have a longitudinal slit, which extends essentially over the entire length of the guide. The longitudinal slit can have a narrow region merging into the bottom, through which a shaft of a first restraining element can engage. The longitudinal slit can have a wide region located therebelow, which can be open to the housing cavity. A head of the restraining element, which has a larger diameter than the width of the narrow region, can be located in this wide region of the longitudinal slit, so that the head of the restraining element axially restrains the restraining element against the guide based on the direction of extension of the shaft. The shaft of the first restraining element does not only engage through the first longitudinal slit, but also a bore of the first ruler, which is located in the region of one of the two ends of the ruler. The bore is located on the end lying opposite the one free end of the ruler. The shaft of the first restraining element can be a threaded shaft, onto which an internal thread can be screwed. The internal thread is preferably formed by the restraining means, which can be a rotary handle, which forms a flat pressure surface, which can move against the broadside surface of the first ruler, which faces upwards. The head of the first restraining element can have a square layout. It is sufficient, however, when the head of the first restraining element has two outer edges, which engage with contact on the side edges of the wider region of the longitudinal slit, so that the first restraining element lies in the longitudinal slit in a non-rotatable manner. The shaft of the first restraining element, together with one end of the longitudinal slit, forms a stop, which defines the maximum displacement path of the first ruler out of the storage position. The position of the first ruler with respect to the housing can be fixed by tightening the rotary handle. The first ruler can have a second longitudinal slit, which, just as the first longitudinal slit, is open towards both narrow sides. A shaft of a second restraining element, which has a head, which lies in a wide section of the second longitudinal slit, engages through this second longitudinal slit. The second longitudinal slit has a narrow region adjacent to the wide region. The slit width is smaller here than the diameter of the head of the second restraining element, so that the second restraining element is axially fastened firmly to the first ruler. The wide region of the second longitudinal slit extends in the rear side of the second ruler, which lies flat on a broadside surface of the first ruler, which faces upwards. The material thickness of the head of the second restraining element is smaller than the depth of the wide region of the second longitudinal slit, which is open to the bottom. The shaft of the second restraining element engages through a bore of the second ruler, which is arranged on one end of the second ruler, which lies opposite a free end of the second ruler. The second restraining means can be a rotary handle comprising an internal thread, which can be screwed onto an external thread of the shaft. A pressure surface of this rotary handle running in a plane can support itself in a clamping manner on the broadside surface of the second ruler, so that a position of the second ruler can be fixed with respect to the first ruler. While the first ruler is guided over its entire extension length within the guide, can thus not be pivoted with respect to the housing, the second ruler can be pulled completely out of the guide. It can be provided that the second ruler can be pivoted with respect to the housing or the first ruler, respectively. This is possible in particular when the second restraining element is located completely outside of the guide.

According to a further development of the invention, it is provided that a protrusion protruding from the underside of the second ruler engages with the longitudinal slit of the first ruler, wherein this protrusion is adjacent to the shaft of the clamping screw, so that the clamping screw and the protrusion are spaced apart from one another at a small distance. Two or more protrusion preferably protrude from the underside of the second ruler, whereby it is in particular provided that the bore for the passage of the clamping screw is arranged between two protrusions. The protrusions can be formed by embossings. A further development of the invention relates to the head of the clamping screw. Said head can have two sections lying axially next to one another. One section can form a support section, which engages below the two edges of the longitudinal slit. The section connected directly thereto can have flattenings, which can adjoin the side walls of the longitudinal slit, so that the clamping screw can lie in a non-rotatable manner in the longitudinal slit of either the first ruler or of the housing.

The following method for tapping a contour and a subsequent transfer of the contour onto a base plate to be installed is possible by means of a contour gauge, which is formed in this way: the contour gauge is brought into the vicinity of an object, the contour of which is to be tapped, in such a way that the contour of the object can be tapped by shifting the feeler fin touching the object. The position of the contour with respect to an already installed base plate is determined in that the second ruler is initially pulled out of the guide with respect to the first ruler when the first ruler is fixed in the storage position, until it has reached its stop position or until it abuts with its stop, which is arranged on the free end, against an outer edge of an already installed base plate. If the distance to the outer edge is larger, the second ruler is restrained to the first ruler by using the restraining means, so that it cannot be displaced with respect to the first ruler. The first restraining means, which restrains the first ruler against the housing in the storage position, is subsequently released, and, together with the first ruler, the second ruler is displaced further in the direction of the outer edge of the already installed base plate, until the stop of the second ruler abuts there. The first ruler is then restrained against the housing again by means of the first restraining means. After the position of the feeler fins has also been fixed by means of a clamping element, the contour gauge can subsequently be brought to a base plate, which is to be cut.

According to a second aspect of the invention, means are to be created, by means of which manufacturing tolerances in the case of the feeler fins can be compensated. The respective contour gauge has an elongated housing, in which a plurality of feeler fins are arranged, which can be displaced transversely to the direction of extension of the housing and which are arranged so as to adjoin one another with contact in a housing cavity of the housing so as to form a fin bundle, wherein a pressure plate in each case adjoins the two feeler fins, which form the ends of the fin bundle. One of the two pressure plates supports itself against the housing. A clamping element, by means of which the feeler fins of the fin bundle can be clamped between the two pressure plates, can act against the other pressure plate. In this position, the feeler fins are fixed in their position by means of frictional engagement. The clamping element can form a clamping lever and an eccentric. By pivoting the clamping lever, the eccentric pivots and displaces the pressure plate assigned to it in the direction of the other pressure plate, so that the distance between the two pressure plate decreases. According to the invention, it is provided that the other, housing-fixed pressure plate can also be displaced in the direction of the pressure plate, which can be displaced by the eccentric. Means are provided, by means of which this position of the pressure plate can be set. The setting means provided for this purpose according to the invention, by means of which the distance of the pressure place can be adjusted with respect to a region of the housing, can be screws and in particular grub screws. The housing can have one or several bores, in which a thread insert, for example made of metal, can be located in each case, into which the external thread of a screw, in particular grub screw, can be screwed. It can be sufficient to use only one adjusting screw. Two adjusting screws are preferably used, which each have a screwing tool engagement opening, for example of an inner bushing hexagonal opening.

A third aspect of the invention, which only requires a contour gauge comprising a find bundle and a ruler assembly having at least one ruler, relates to the stop, which is arranged on the free end of the ruler. The ruler assembly is arranged in the region of the back of the housing. The back lies opposite a set-up side of the housing, by means of which the housing can be set up, for example, on the floor, which is to be provided with a floor covering. The stop is formed by a stop carrier, which can be firmly connected to the free end of the ruler and which can form a bearing surface, which can run transversely to the broadside surface of the ruler. While the ruler can be displaced, for example, in a horizontal direction with respect to the housing, a stop plate fastened to the bearing surface of the stop carrier can be displaced downwards in the vertical direction. In a non-use position, the bearing plate can assume its upper position, in which its lower outer edge is spaced apart from the floor. In the use position, the stop plate can be lowered until its lower outer edge bears on the floor. It can be provided that, in a storage position, in which it assumes its upper position and in which the ruler is retracted completely into the guide, the bearing plate lies in a depression of a front side of the housing. If the ruler is pulled out of the guide, the stop plate can be lowered. The stop plate can have two longitudinal slits, through which fastening means engage, by means of which the stop plate is fastened to the stop carrier.

BRIEF DESCRIPTION OF THE DRAWINGS

Exemplary embodiments of the invention will be described below on the basis of enclosed drawings, in which:

FIG. 11 shows the detail XI in FIG. 6 in an enlarged manner, FIG. 12 shows the detail XII in FIG. 10 in an enlarged manner, FIG. 13 shows the detail XIII in FIG. 10 in an enlarged manner.

DESCRIPTION OF THE EMBODIMENTS

Figure 1:
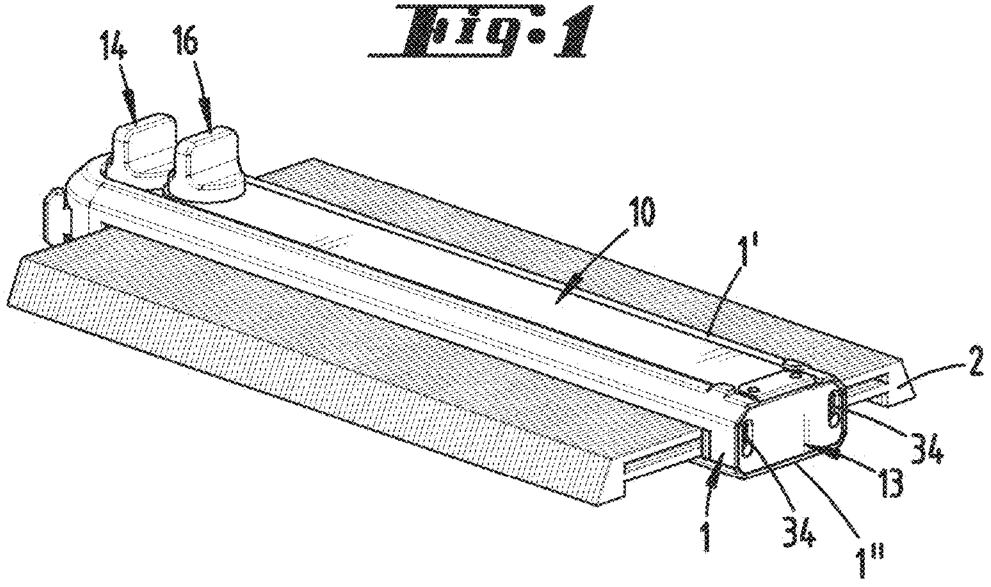
FIG. 1 shows a contour gauge in a perspective illustration comprising two rulers 7, 10, which are located in a storage position.

The contour gauge illustrated in the figures has a housing 1, which consists of an upper housing part 1' and a lower housing part 1". On the back facing upwards, the upper housing part 1' has a depression running over almost the entire width of the elongated housing 1, which forms a guide 3. The depression has a bottom 5 extending in a plane and a side wall. The side wall has two elongated sections 4 running in a straight line and a rounded end. The end of the guide 3 lying opposite the rounded end is open.

The lower housing part 1" has the same length as the upper housing part 1'. The two housing parts 1' and 1" are connected to one another on their ends. A housing cavity 18 extends between the sections, on which the housing parts 1', 1" are connected to one another. A fin bundle consisting of a plurality of feeler fins 2 is arranged in the housing cavity 18. The feeler fins 2 have the same shape among one another. They consist of flat plastic strips, which have a trapezoidal layout. The feeler fins 2 have a cavity 2', through which a plate 26 extends, which limits the displacement path of the feeler fins 2 in a direction transversely to the direction of extension of the housing 1 on the one hand and which can also absorb a pull on the other hand, when a pressure is applied to the fin bundle by means of two pressure plates 21, 22, so that the individual feeler fins 2, which adjoin one another with contact, can be held in position by means of frictional engagement.

Two elongated flat rulers 7, 10 lie in the above-described depression, which forms a guide 3. A first ruler 7 bears with a lower broadside surface on the bottom 5. The bottom 5 has a longitudinal slit 6, which extends over almost the entire length of the guide 3 and which has a narrow region 6' and a wider region 6" located therebelow, which is open towards the housing cavity 18. A second ruler 10 bears with its broadside surface, which faces downwards, on the broadside surface of the first ruler 7, which faces upwards. Both rulers 7, 10 have the same width, so that they can adjoin with their narrow outer edges against the side walls 4 of the guide 3.

A threaded shaft 15' of a clamping screw 15, which has a rectangular, preferably approximately square head 15", is inserted in the longitudinal slit 6. The head 15" lies in the wide region 6" of the longitudinal slit 6. The width of the narrow region 6' of the longitudinal slit 6 corresponds approximately to the diameter of the threaded shaft 15'. The width of the wide region 6" of the longitudinal slit 6 corresponds approximately to the distance of two outer edges of the head 15" lying opposite one another, so that the clamping screw 15 is fastened in a rotationally fixed manner and axially fixed manner to the housing. The clamping screw 15, however, can displace within the longitudinal slit 6 in the direction of extension thereof.

The first ruler 7 as a blunt end and a rounded end. The end can also be formed in an angular manner, however. A bore 8, through which the threaded shaft 15' protrudes, is located in the region of the rounded end. A handle 14 forming a restraining means, which has a flat pressure surface facing the broadside surface of the first ruler 7 facing upwards, is screwed onto the threaded shaft 15'. A clamping force can be applied to the first ruler 7 by means of the handle 14. If the first ruler 7 is shifted within the guide 3, the respective position can be fixed by means of the restraining means 14.

Figure 7:
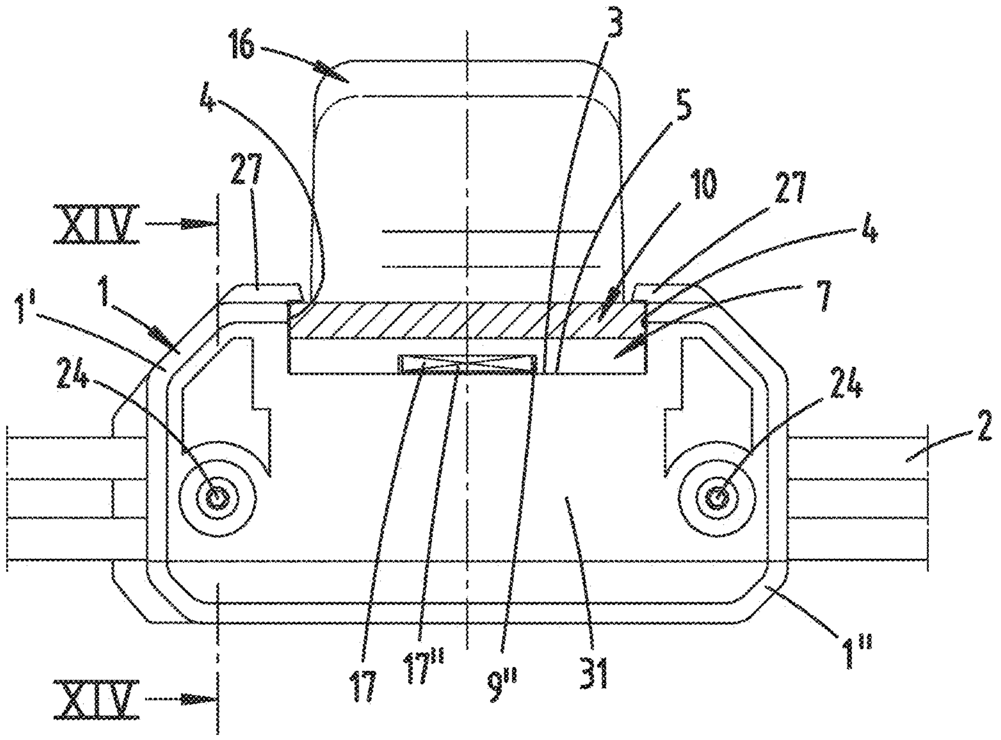
FIG. 7 shows the section according to the line VII-VII in FIG. 5.
Figure 8:
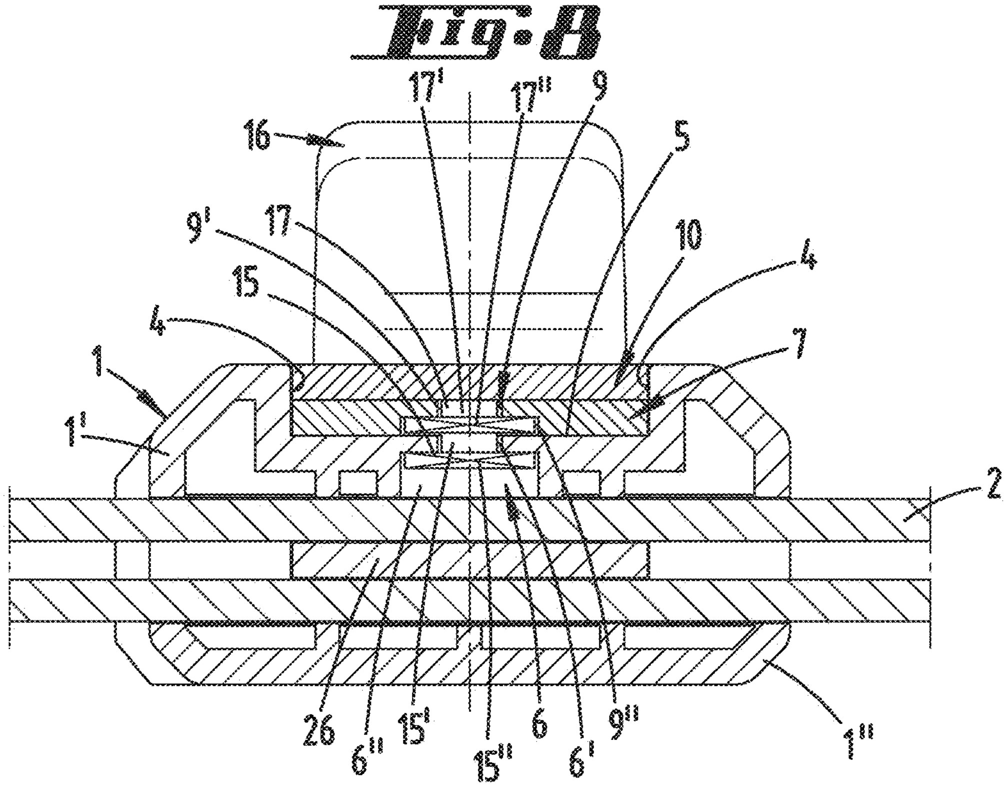
FIG. 8 shows the section according to the line VIII-VIII in FIG. 5.
Figure 9:
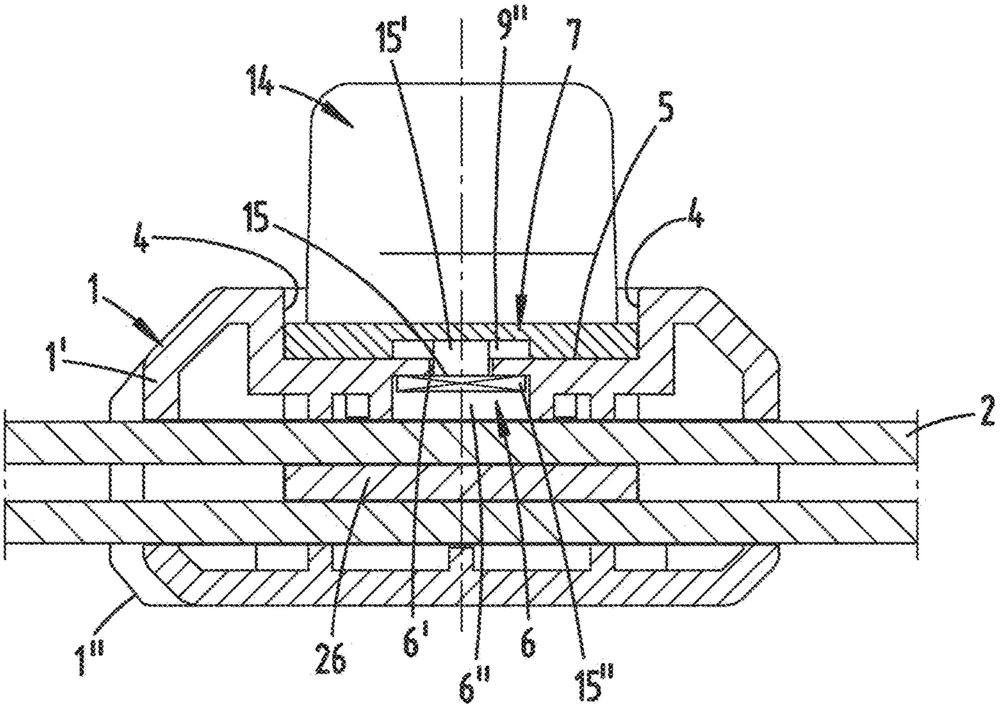
FIG. 9 shows the section according to the line IX-IX in FIG. 5.
Figure 10:
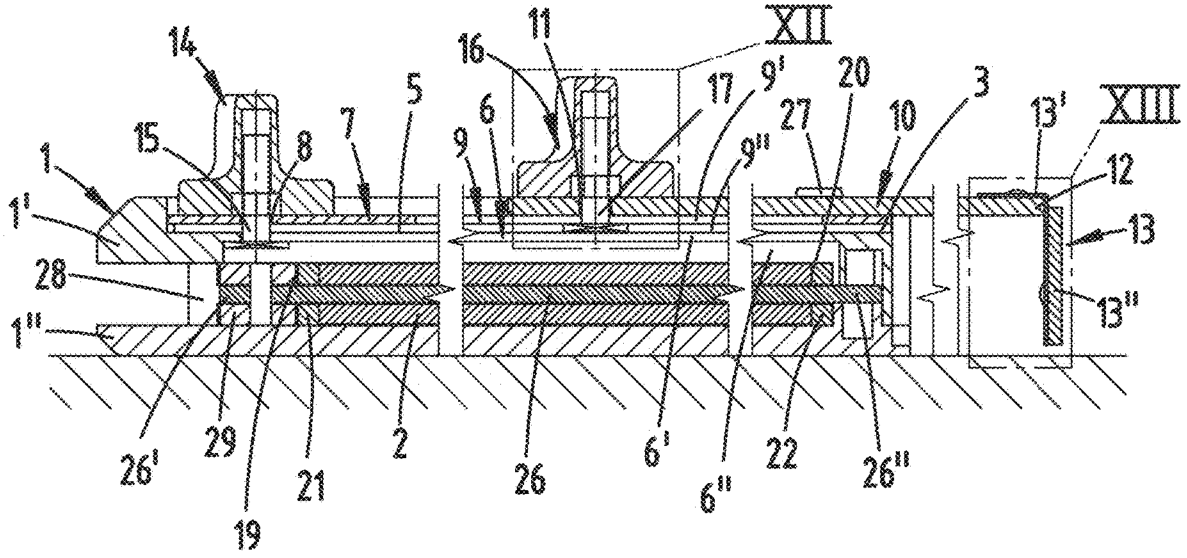
FIG. 10 shows the section according to the line X-X in FIG. 5.

The first ruler 7 has a broadside surface facing downwards, by means of which the ruler 7 bears on the bottom 5. An elongated depression formed by a groove extends over the entire length of the first ruler 7 in the lower broadside surface. This depression forms a wide region 9" of a longitudinal slit 9, which, unlike the depression, is not open on both sides but is closed on both sides. A threaded shaft 17' of a second clamping screw 17 engages through the longitudinal slit 9. A flat head 17" of the clamping screw 17, which has a rectangular or preferably square layout, is located in the depression forming the wide region 9" of the longitudinal slit 9. The depth of the depression is slightly smaller than the material thickness of the head 17", so that the head 17" can be displaced in an essentially unhindered manner in the longitudinal direction with respect to the second ruler 10, wherein the lower broadside surface of the second ruler simultaneously bears on the upper broadside surface of the first ruler. The upper broadside surface of the second ruler 7 thus closes the depression formed by the wide region 9" of the longitudinal slit 9 to form a shaft with a rectangular cross section (see FIGS. 7, 8 and 9).

The second ruler 10 can be shifted with respect to the first ruler 7, wherein the second clamping screw 17 thereby displaces with respect to the first ruler 7. The threaded shaft 17' of the second clamping screw 17 additionally engages through a bore 11 of the second ruler 10. A second handle 16, which likewise forms a flat pressure surface, which moves against the broadside surface of the second ruler 10 facing upwards when the external thread of the threaded shaft 17' is screwed into an internal thread of the handle 16, is screwed onto the threaded shaft 17" in order to clamp the second ruler 10 against the first ruler 7.

The guide 3 is open to the top but is engaged over by two protrusions 27 in the region of its edge-side opening. It can also be engaged over by at least one other holder. The two protrusions 27 adjoin an edge region of the second ruler 10. As long as the second ruler 10 is located within the guide 3, it cannot be pivoted with respect to the first ruler 7. It is possible, however, to pivot the second ruler 10 with respect to the first ruler 7 when the connecting point of the second ruler 10 with the first ruler 7 is pulled out of the guide 3.

Figure 24:
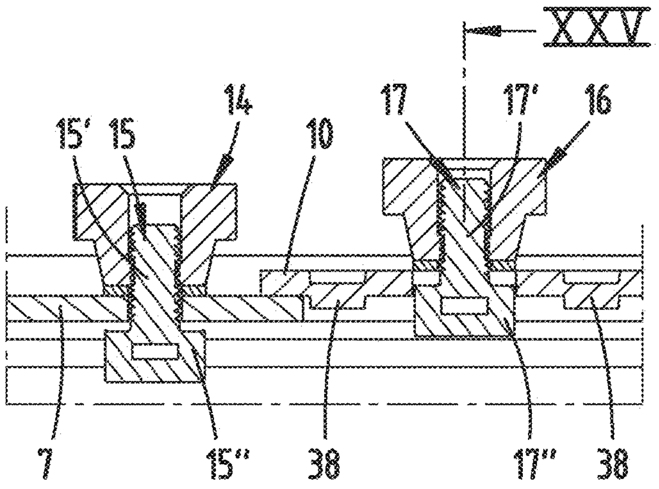
FIG. 24 shows an illustration similar to FIG. 10 or 12 of a second exemplary embodiment.
Figure 25:
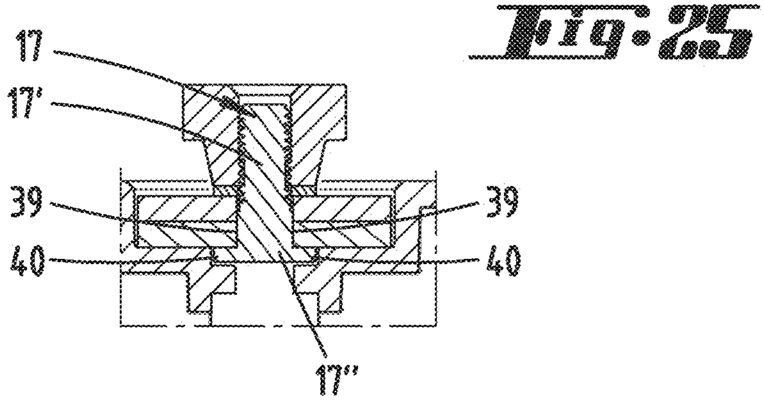
FIG. 25 shows the section according to the line XXV-XXV in FIG. 24.
Figure 26:
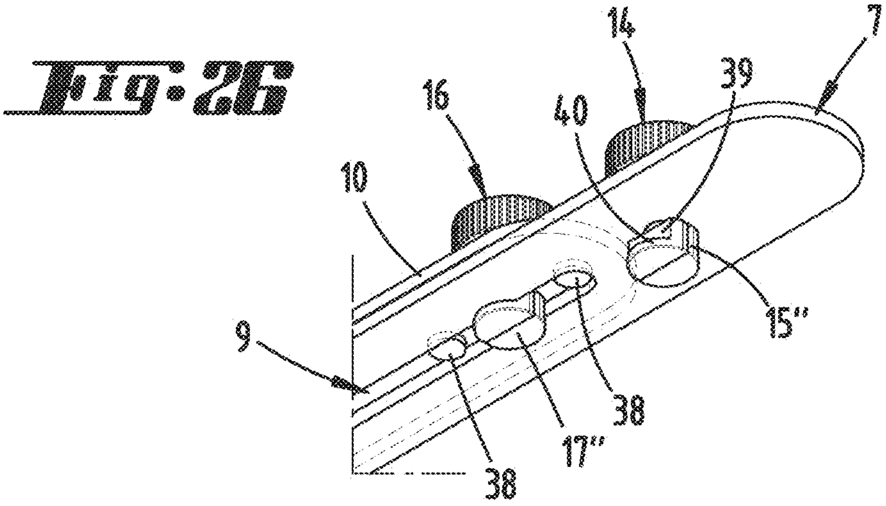
FIG. 26 shows a perspective illustration of the two restraining means 14, 16.

The second exemplary embodiment illustrated in FIGS. 24 to 26 has means, by means of which a pivoting of the second ruler 10 with respect to the first ruler 7 is prevented. In addition to the threaded shaft 17', further elements, which engage with the longitudinal slit 9, are provided there in the longitudinal slit 9.

In the case of the exemplary embodiment, the underside of the second ruler 10 has two protrusions 34, which protrude downwards and which can engage with the longitudinal slit 9. The bore 11, through which a threaded shaft 17' of a clamping screw 17 can engage, is located between the two protrusions 34. The clamping screw 17 has a head 17', which has a diameter. The two protrusions 34 are spaced apart from the bore 11 approximately by the dimension of this diameter.

In the case of the exemplary embodiment, the protrusions 34 are formed by embossings, which have been created by means of an embossing tool.

The second exemplary embodiment additionally differs with respect to the first exemplary embodiment by the shape of the head 17", the latter has two flattenings 39 lying opposite one another, which are spaced apart from one another by the width of the longitudinal slit 9, so that the flattenings 39 can adjoin the two walls of the longitudinal slit 9, which leads to a protection against rotation of the clamping screw 17. The free end of the head 17" is formed by two support sections 40 engaging under the edges of the longitudinal slit 9. The front surface of the head 17" has a circular shape.

The FIG. 25 shows the second clamping screw 17. The first clamping screw 15 can be formed identically.

Figure 16:
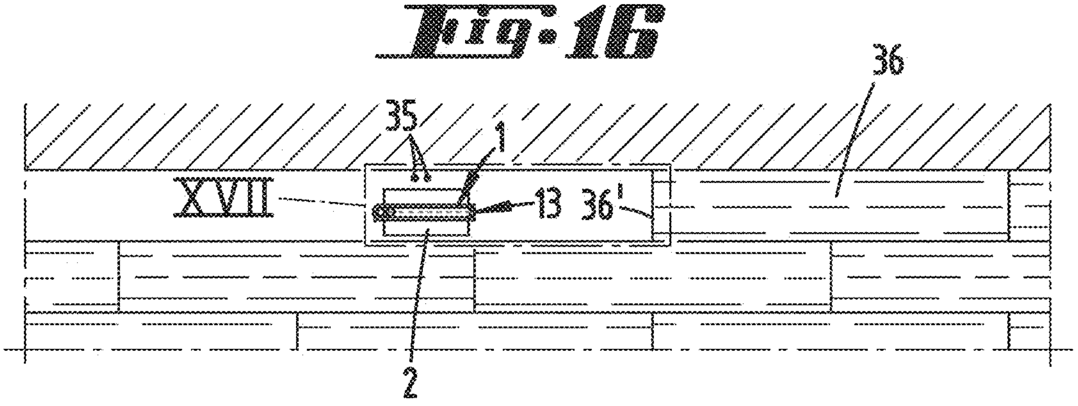
FIG. 16-19 show the sequence for tapping a contour of an object 35.

The mode of operation of the above-described contour gauge is described on the basis of FIGS. 16-19. The FIG. 16 shows the floor of a room, in which base plates 36 have been installed. An outer edge 36' of a base plate 36 points in the direction of a region, in which base plates 36 have not yet been installed, but in which an interfering object is located. In the exemplary embodiments, these are two pipes 35.

Figure 17:
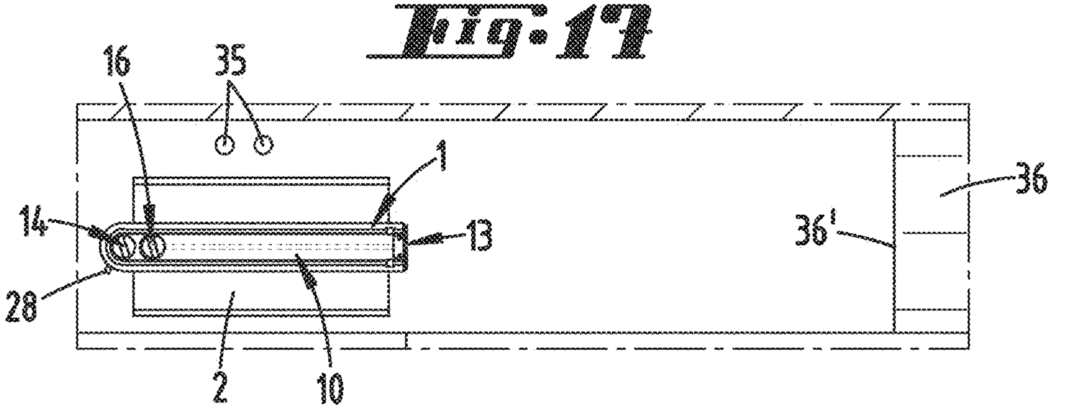
Figure 18:
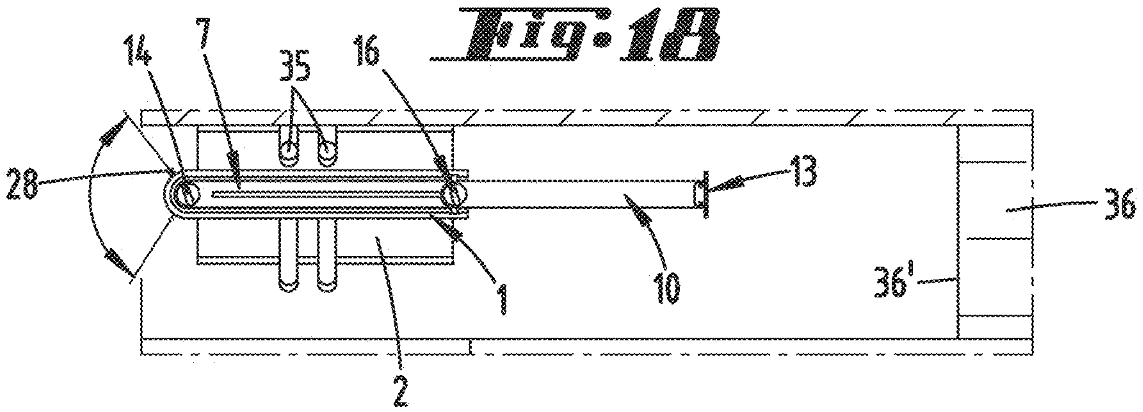

The FIG. 17 shows the section XVII in FIG. 16 in an enlarged manner. The contour gauge 1 has a distance a to the outer edge 36' of the base plate 36, which is selected randomly. However, the distance a is selected so that the contour of the two pipes 35 can be tapped by means of the feeler fins 2. This takes place by means of a transverse displacement of the feeler fins 2 with respect to the housing 1. The distance a can be tapped by means of the two rulers 7, 10. For this purpose (see FIG. 18), the ruler 10 lying on the top is initially pulled out of the guide completely, until it has reached its stop position, in which the threaded shaft 17 abuts against the end of the longitudinal slit 9. The position of the second ruler 10 is then fixed with respect to the first ruler 7 by means of the restraining means 16.

Figure 19:
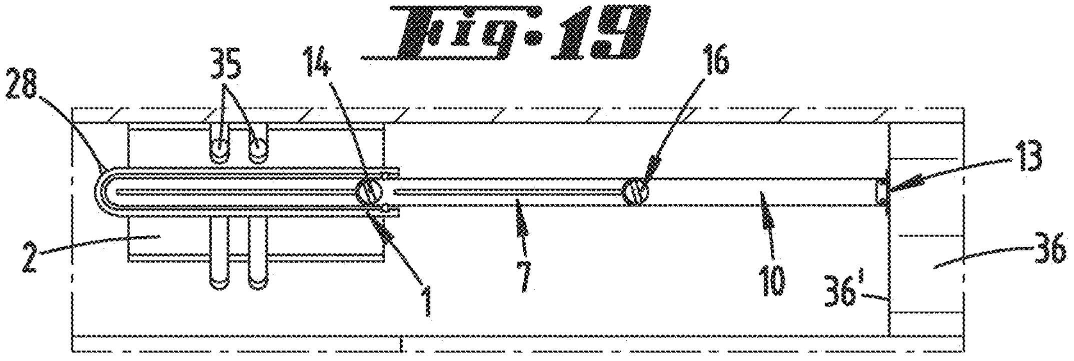

After releasing the first restraining means 14, the first ruler 7 is subsequently pulled out of the guide 3—as it is shown by the FIG. 19—until the stop 13, which is fastened to the free end 12 of the second ruler 10, abuts against the outer edge 36'.

Figure 20:
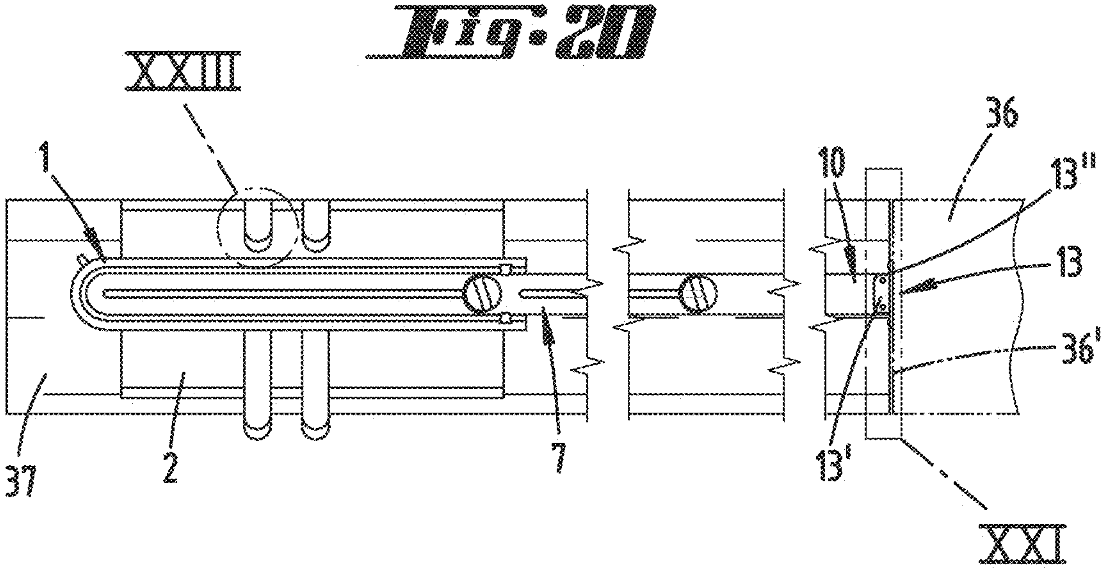
FIG. 20 shows an illustration similar to FIG. 19, whereby the contour gauge is placed with the tapped dimension onto a base plate 37, in order to transfer the dimension thereto.
Figure 21:
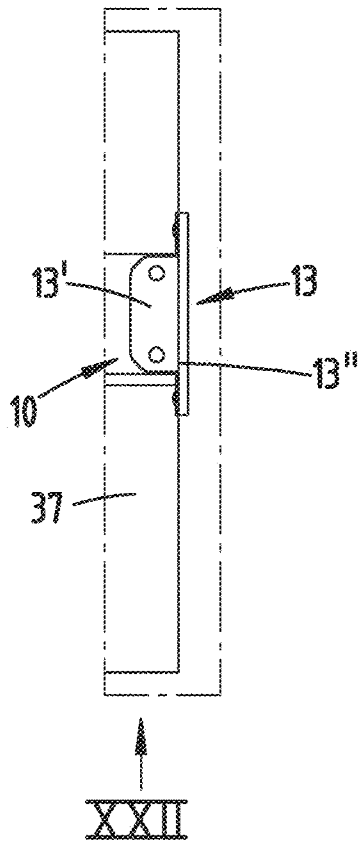
FIG. 21 shows the section XXI in FIG. 20 in an enlarged manner.
Figure 22:
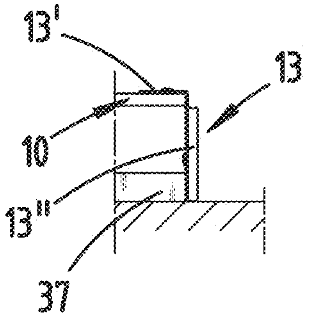
FIG. 22 shows the section XXII in FIG. 21.
Figure 23:
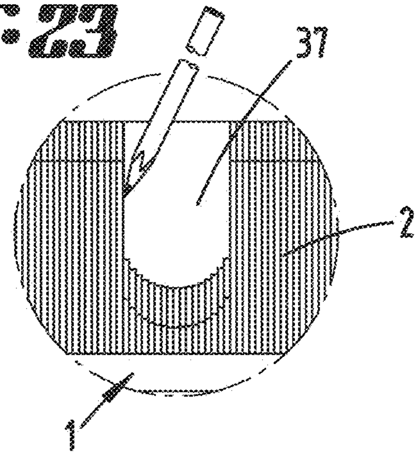
FIG. 23 shows the section XXIII in FIG. 20.

After the tightening of the restraining means 14, 16, the device can be placed onto a base plate 37 to be installed, as it is shown by the FIG. 20. The stop plate 13" can thereby be attached to an outer edge of the base plate 37 to be installed, as the FIGS. 21 and 22 show in an enlarged manner. The tapped contours can then be drawn onto the base plate 37 to be installed by means of a pencil, as it is clarified by the FIG. 23.

In that a surface of the stop plate 13', which faces to the outside, is used during the tapping of the dimension, and the opposite broadside surface of the stop plate 13' during the marking of the dimension, a slight offset can occur, which is tolerable, however, because the stop plate 13' is generally thinner than the feeler fin 2. In order to compensate for this offset, it is also possible on the other hand, however, to give the stop plate 13' a certain movement play in the direction of extension of the ruler assembly, for example in that pins 33 with a larger axial length are used.

To restrain the feeler fins 2 to one another, a clamping element is provided that has an eccentric 29 and a clamping lever 28 fastened thereto. The eccentric 29 can be rotated about a housing-fixed axis of rotation. Due to the eccentric layout contour, a pressure can be exerted on the pressure plate 21, which is located between the eccentric 29 and a feeler fin 2 arranged on the edge side of the fin bundle.

The tension plate 26 engages through the cavities 2' of the feeler fins 2. The tension plate thereby also passes through a longitudinal slit of the pressure plate 21, which can be displaced by rotating the eccentric 29 with respect to the tension plate 26. The end 26' of the tension plate 26 can be pinned to the housing.

An outermost feeler fin 2, which a second pressure plate 22 adjoins, is likewise located on the other end of the fin bundle. This pressure plate 22 also has a longitudinal slit, through which an end 26" of the tension plate 26 engages, which can be pinned to the housing.

Figure 14:
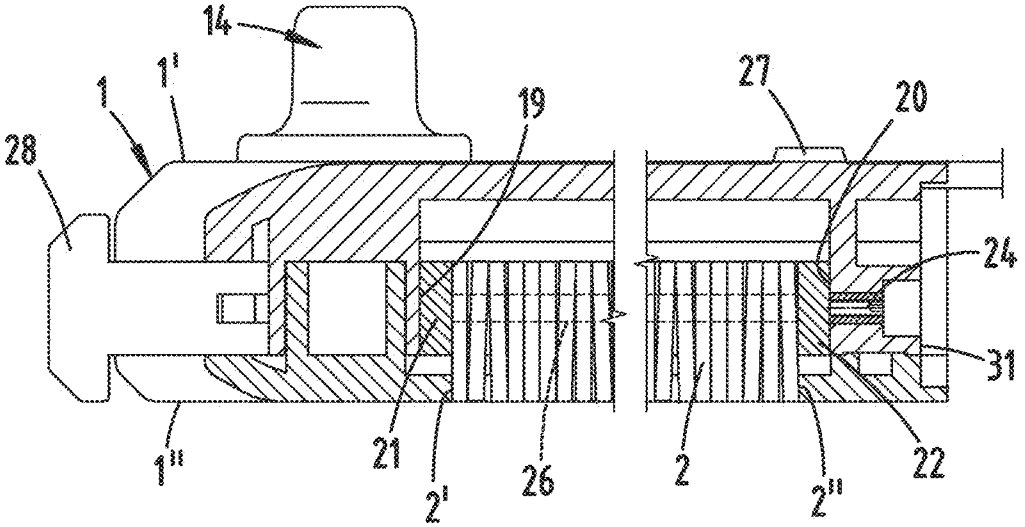
FIG. 14 shows the section according to the line XIV-XIV in FIG. 7.
Figure 15:
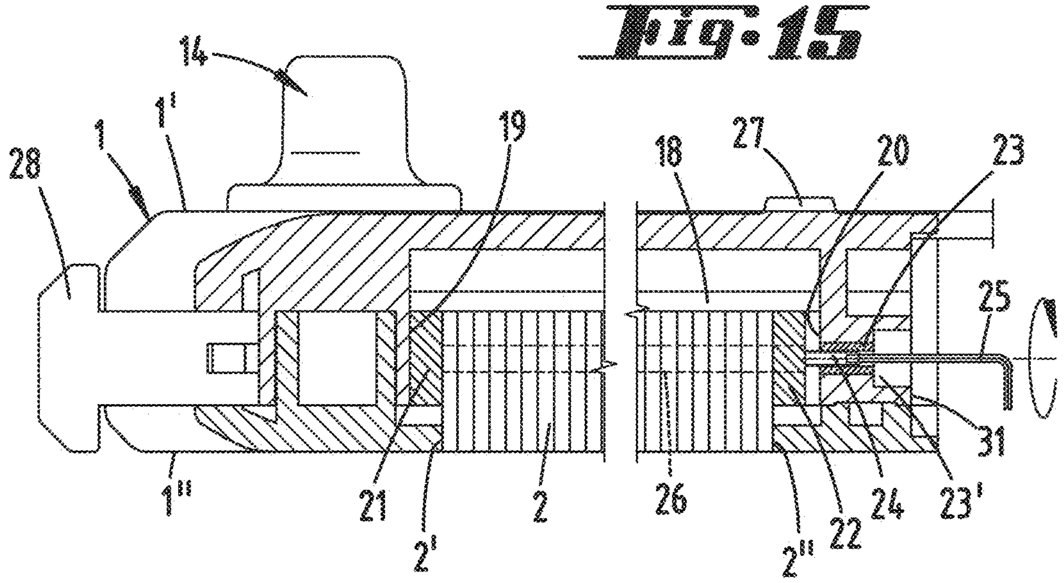
FIG. 15 shows an illustration according to FIG. 14, but with displaced pressure piece 22.

The FIG. 14 shows the pressure plate 22 in an attached position to a cavity wall 20. In an attached position, the pressure plate 21 lies on an opposite cavity wall 19. When the clamping lever 28 is actuated and the eccentric 29 is rotated, the pressure plate 21 moves away from the housing wall 19 and exerts a pressure, which is directed to the right in the FIG. 14, which pushes the individual feeler fins 2 of the fin bundle against one another. Due to the fact that the material thickness of the feeler fins 2 is subject to tolerances, it may happen that this displacement distance is not sufficient to clamp the feeler fins 2 to one another in a sufficient way.

Figure 3:
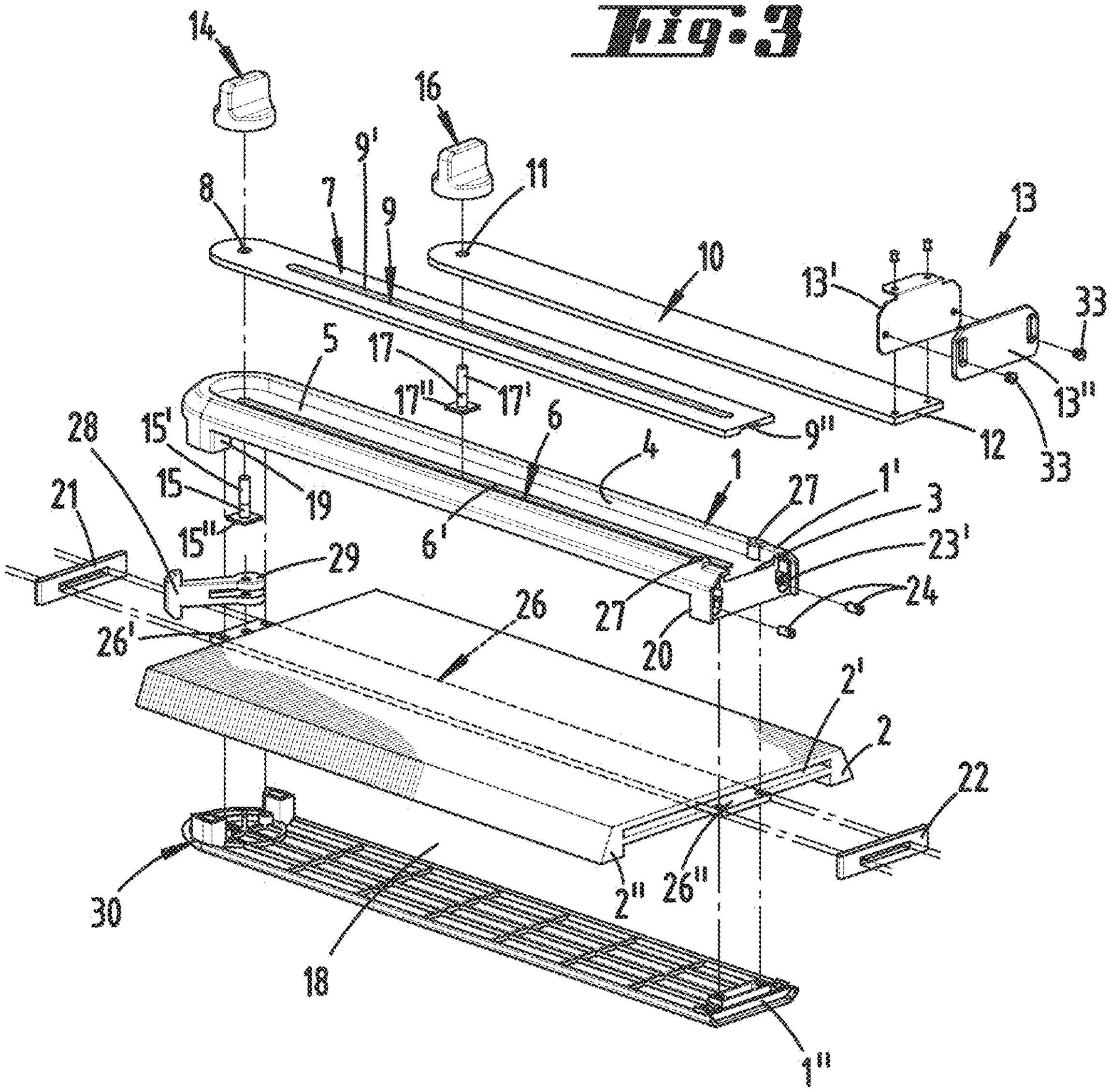
FIG. 3 shows a first exploded illustration of the essential elements of the contour gauge.
Figure 4:
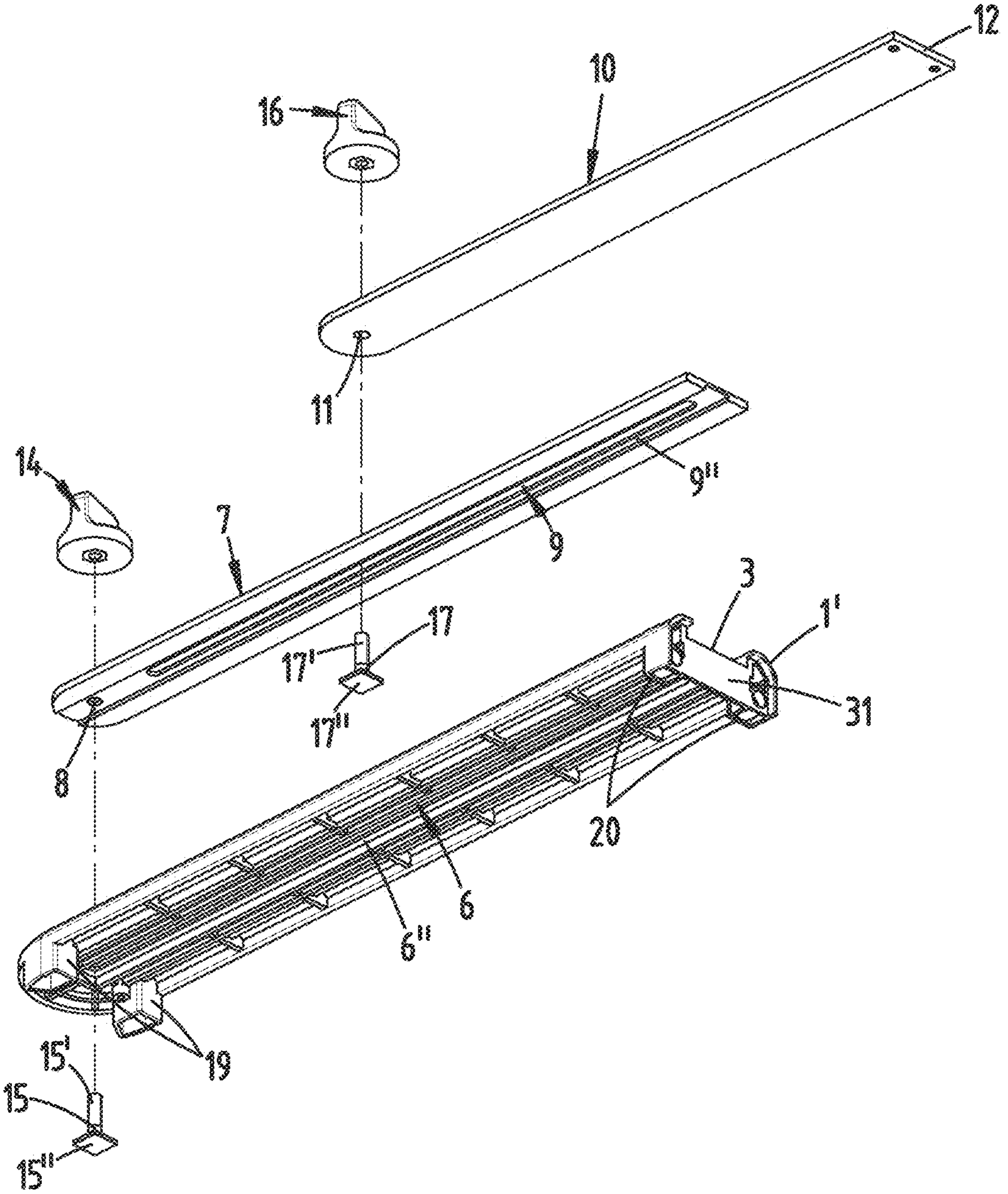
FIG. 4 shows a second exploded illustration of the upper housing part 1', of the first ruler 7 and of the second ruler 10.
Figure 5:
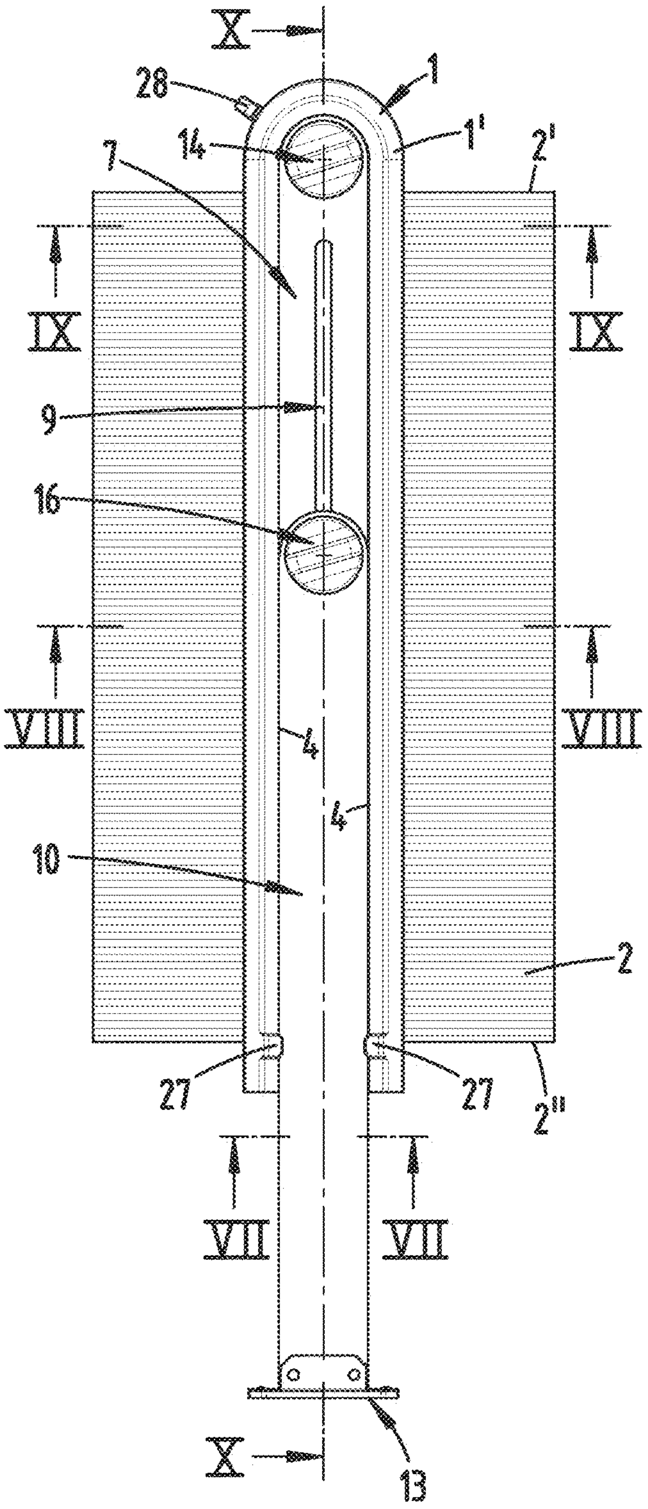
FIG. 5 shows a top view onto the contour gauge in a position of the first ruler 10 according to FIG. 2.
Figure 6:
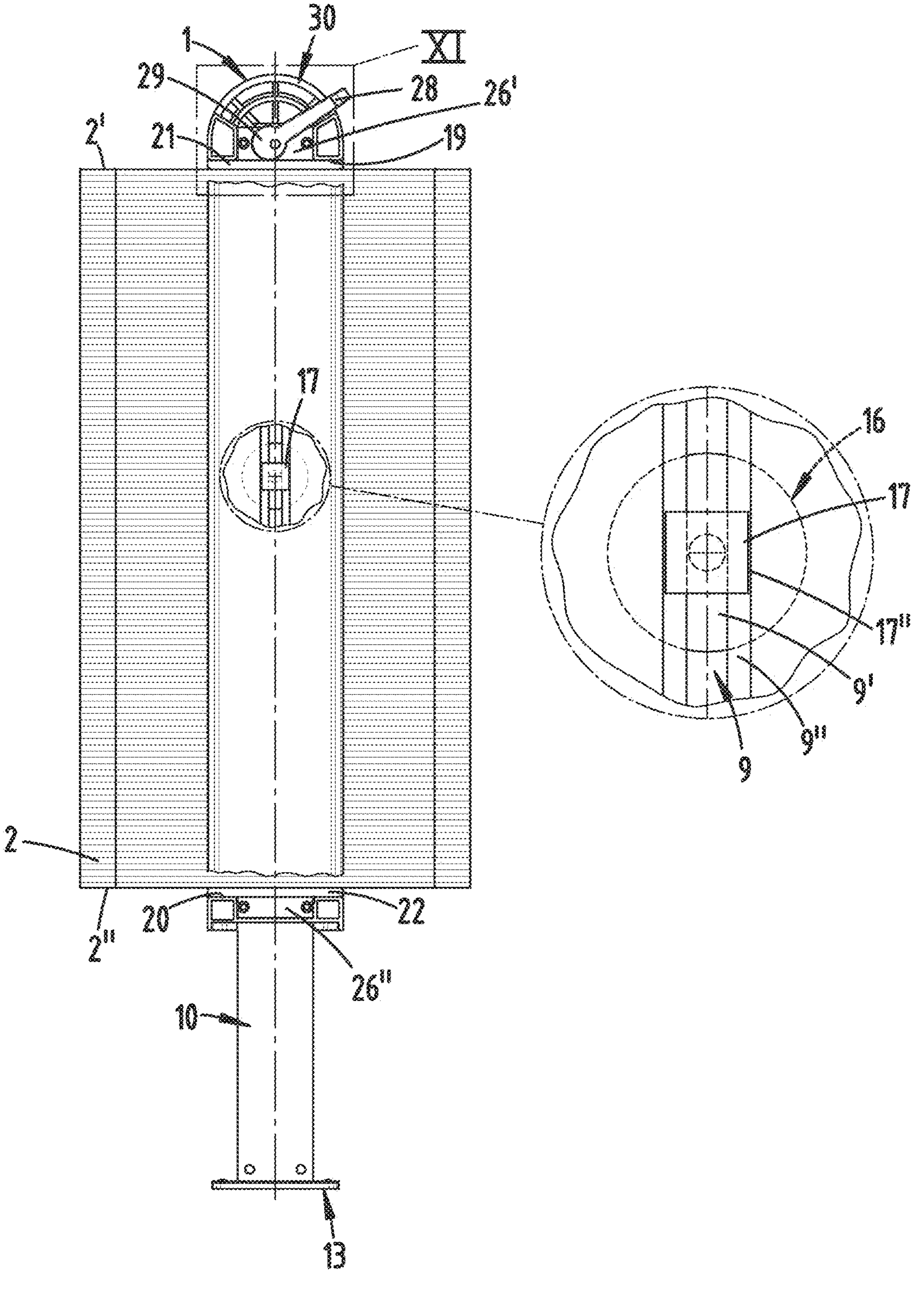
FIG. 6 shows a rear view.

A screw is identified with the reference numeral 24. This screw 24 is inserted in a thread insert 23, which is located in the cavity wall 20. The thread insert 23 has an internal thread 23', which engages with the external thread of the screw 24, which is preferably a grub screw. It can be gathered from the FIG. 3 that there is a total of two of these screws 24, which engage with the front end on a broadside surface of the pressure plate 22, in order to displace the pressure plate 22 in the direction of the pressure plate 21, when the screws 24 are rotated by means of a screwing tool 25. The distance between the pressure plates 21, 22 shortens thereby, so that material thickness tolerances of the feeler fins 2 can be compensated.

Figure 2:
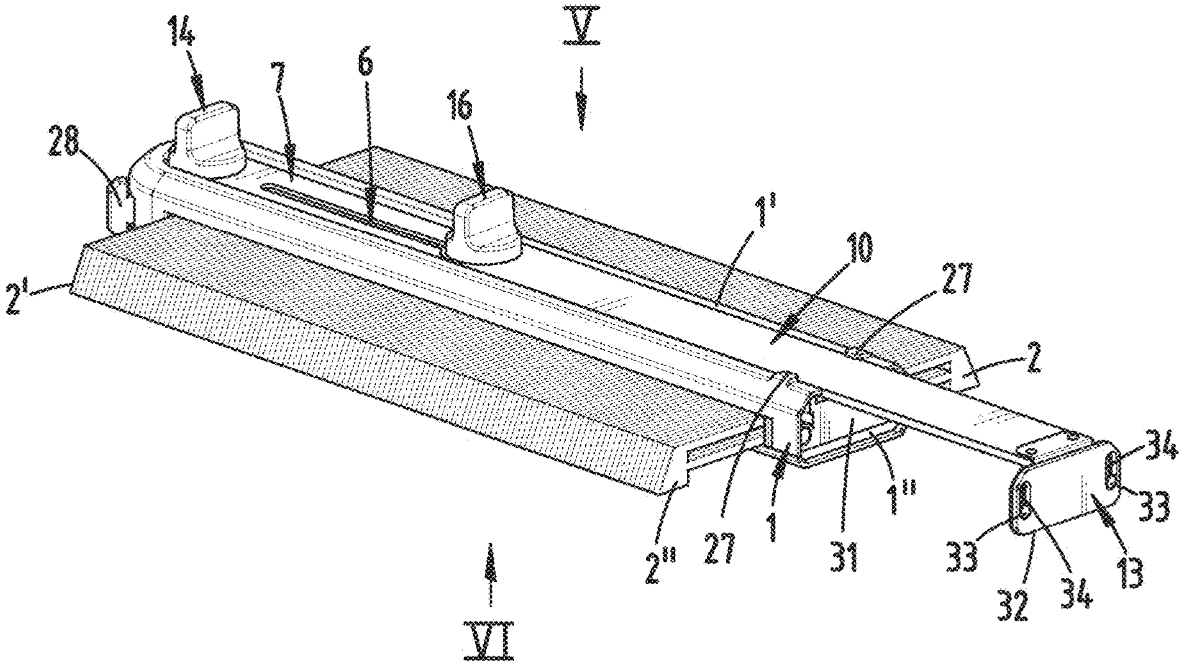
FIG. 2 shows an illustration according to FIG. 2, but whereby a ruler 10 has been displaced with respect to the storage position.

It can be gathered from the FIG. 2 that a front side of the housing 1 has a depression 31. This depression 31 has a bottom. The two above-described screws 24 are located in the bottom.

A stop 13 is fastened to the free end 12 of the second ruler 10. The stop 13 has an angle-shaped stop carrier 13', which is fastened to the free end 12 of the second ruler 10 by means of a rivet, a screw or the like. A leg of the stop carrier 13', which protrudes downwards therefrom at a right angle, forms a bearing surface, which a stop plate 13' adjoins. The stop plate 13' has a lower outer edge 32 and two longitudinal slits 34, through which a pin 33 or a screw engages in each case, by means of which the stop plate 13' is fastened to the bearing surface of the stop carrier 13'. The stop plate 13' can be displaced in the vertical direction between a storage position, in which the stop plate 13' can lie in a depression 31 of the housing, into a use position, in which the lower outer edge 32 bears on a floor, to which the housing 1 is attached.

A distance a to very flat floor coverings can also be tapped by means of this vertical displaceability of the stop plate 13'.

In the case of the exemplary embodiment, the ruler assembly has two rulers lying one on top of the other. It is also possible, however, to place several rulers one on top of the other, whereby the rulers lying directly on top of one another can be shiftable with respect to one another.

The above statements serve to describe the inventions, which are captured as a whole by the application and which further develop the prior art at least by means of the following feature combinations, in each case also independently, whereby two, several or all of these feature combinations can also be combined, namely:

A contour gauge, which is characterized in that a first restraining means 14, 15 is provided, by means of which the first ruler 7 can be fixed in at least one intermediate position between the first storage position and the first stop position with respect to the housing 1, and that a second restraining means 16 is provided, by means of which the second ruler 10 can be fixed in at least one intermediate position between the second storage position and the second stop position with respect to the first ruler 7.

A contour gauge, which is characterized in that the guide 3 is an elongated depression open to the top, which forms a bottom 5 and the side walls 4, wherein the bottom 5 has a first longitudinal slit 6, through which a shaft 15' of a first restraining element 15 engages, which also engages through a bore 8 of the first ruler 7 and with which the first restraining element 14 cooperates and/or that the first ruler 7 has a second longitudinal slit 9, through which a shaft 17' of a second restraining element 17 engages, which also engages through a bore 11 of the second ruler 10 and with which the second restraining element 16 cooperates.

A contour gauge, which is characterized in that the first longitudinal slit 6 has a narrow region 6', through which the shaft 15' of the first restraining element 15 engages, and a wide region 6", in which a head 15" of the first restraining element 15 is shiftably mounted in the direction of extension of the housing 1 and/or that the second longitudinal slit 9 has a narrow region 9', through which the shaft 17' of the second restraining element 17 engages, and a wide region 9", in which a head 17" of the second restraining element 17 is shiftably mounted in the direction of extension of the first ruler 7.

A contour gauge, which is characterized in that the head 15" of the first restraining element 15 and/or the head 17" of the second restraining element 17 has outer edges facing away from one another, which adjoin edges of the wide region 6" or 9" so as to secure a non-rotatability of the shaft 15' or 17', wherein the shafts 15' or 17' are threaded shafts, onto which an internal thread of the respective restraining means 14, 16 is screwed.

A contour gauge, which is characterized in that the head 17" of the second restraining element 17 has a material thickness, which corresponds to the depth of the wide region 9" of the longitudinal slit 9 facing the first ruler and/or that the first ruler 7 and the second ruler 10 has the same width, which corresponds to the distance of the side walls 4 of the guide 3 and/or that one or several holding elements or protrusions 27, which engage at least over the edge of the second ruler 10, are arranged in the region of an open narrow side wall of the guide 3.

A contour gauge, which is characterized in that the restraining means 14, 16 are formed by rotary handles, which form a flat pressure surface, which faces the first ruler 7 or the second ruler 10, respectively, and which can be pressed against the broadside surface of the first ruler 7 or of the second ruler 10, respectively, which faces upwards, by means of a rotation of the restraining means 14, 16 about a thread axis, in order to clamp the first ruler 7 between the pressure surface and the bottom 5 and to clamp the second ruler 10 between pressure surface and broadside surface of the second ruler 7 facing upwards.

A contour gauge, which is characterized in that in the first stop position, the shaft 15" adjoins a closed end of the first longitudinal slit 6 and/or that in the second stop position, the shaft 17" adjoins a closed end of the second longitudinal slit 9 and/or that in the storage position, the two rulers 7, 10 lie completely in the guide 3 and/or that on a free end 12, which lies opposite the bore 8, the second ruler 10 is fastened to a stop carrier 13' of a stop, to which a stop plate 13' is fastened, which can be displaced in the direction transversely to the direction of extension of the second ruler 10.

A contour gauge, which is characterized in that the distance of the first pressure plate 21 can be adjusted with respect to the second pressure plate 22 by means of setting means 23, 24, wherein it is in particular provided that the setting means is formed by one or several screws, in particular grub screws 24 and an internal thread 23' assigned to the housing 1, whereby the distance can be adjusted by rotating the grub screws 24.

A contour gauge, which is characterized in that the stop 13 has a stop carrier 13', which is connected to the free end 12 of the ruler 10 and forms a bearing surface, which runs transversely thereto and which a stop plate 13' adjoins, which is capable of being displaced in height in a direction of the set-up side with respect to the bearing surface of the stop carrier 13'.

All of the disclosed features (alone but also in combination with one another) are essential for the invention. The disclosure content of the corresponding/enclosed priority documents (copy of the prior application) is herewith also included in its entirety in the disclosure of the application, also for the purpose of adding features of these documents into claims of the present application. With their features, the subclaims characterize, even without the features of a referenced claim, separate inventive further developments of the prior art, in particular in order to file divisional applications on the basis of these claims. The invention specified in each claim can additionally have one or several of the features, which are in particular provided with reference numerals in the above description and/or which are specified in the list of reference numerals. The invention also relates to designs, in the case of which individual features of the features mentioned in the above description are not realized, in particular insofar as they are evidently dispensable for the respective intended purpose or can be replaced by other technically equivalent means.

LIST OF REFERENCE NUMERALS

1 housing
1' housing upper part
1" housing lower part
2 feeler fin
2' cavity
3 guide
4 side wall
bottom
6 longitudinal slit
6' narrow region
6" wide region
7 first ruler
8 bore
9 longitudinal slit
9' narrow region
9" wide region
second ruler
11 bore
12 free end
13 stop
13' stop carrier
13" stop plate
14 first restraining means, handle
first clamping screw
15' threaded shaft
15" head
16 second restraining means handle
17 second clamping screw
17' threaded shaft
17" head
18 housing cavity
19 cavity wall
20 cavity wall
21 pressure plate
22 pressure plate
23 threaded sleeve
23' internal thread
24 screw, grub screw
25 screwing tool
26 tension plate
26' first end of the tension plate
26" second end of the tension plate
27 protrusion
28 clamping lever

29 eccentric section
30 housing appendage
31 depression
32 lower outer edge
33 pin or screw
34 longitudinal slit
35 object/pipe
36 installed base plate
36' outer edge
37 base plate
38 protrusion
39 flattening
40 support section
a distance

The invention claimed is:

1. A contour gauge comprising an elongated housing (1), in which a plurality of feeler fins (2) are arranged so as to adjoin one another with contact, said contact fins being displaceable transversely to a direction of extension of the housing (1), and comprising a ruler assembly configured for tapping a distance to an object spaced apart from the housing (1) in the direction of the extension of the housing, wherein the ruler assembly has a first ruler (7), which is guided on side walls (4) of a guide (3) of the housing (1), which is configured to be pulled out of the guide (3) from a first storage position within the guide (3) all the way into a first stop position in the direction of extension of the housing (1), and which carries a second ruler (10), which is configured to be displaced with respect to the first ruler (7) from a second storage position all the way into a second stop position in the direction of extension of the housing (1), wherein a first restraining means (14, 15) is provided, which is configured for fixing the first ruler (7) in at least one intermediate position between the first storage position and the first stop position with respect to the housing (1), and wherein a second restraining means (16) is provided, which is configured for fixing the second ruler (10) in at least one intermediate position between the second storage position and the second stop position with respect to the first ruler (7).

2. The contour gauge according to claim 1, wherein the guide (3) is an elongated depression open to a top, which forms a bottom (5) and the side walls (4), wherein the bottom (5) has a first longitudinal slit (6), through which a shaft (15') of a first restraining element (15) of the first restraining means engages, which also engages through a bore (8) of the first ruler (7) and with which a second restraining element (14) of the first restraining means cooperates and/or wherein the first ruler (7) has a second longitudinal slit (9), through which a shaft (17') of a first restraining element (17) of the second restraining means engages, which also engages through a bore (11) of the second ruler (10) and with which second restraining element (16) of the second restraining means cooperates.

3. The contour gauge according to claim 2, wherein the first longitudinal slit (6) has a narrow region (6'), through which the shaft (15') of the first restraining element (15) engages, and a wide region (6") that is wider than the narrow region (6'), in which a head (15") of the first restraining element (15) is shiftably mounted in the direction of extension of the housing (1) and/or wherein the second longitudinal slit (9) has a narrow region (9'), through which the shaft (17') of the second restraining element (17) engages, and a wide region (9") that is wider than the narrow region (9'), in which a head (17") of the second restraining element (17) is shiftably mounted in the direction of extension of the first ruler (7).

4. The contour gauge according to claim 3, wherein the head (15") of the first restraining element (15) and/or the head (17") of the second restraining element (17) has outer edges facing away from one another, which adjoin edges of the wide region (6" or 9") of the respective first or second longitudinal slit, so as to secure a non-rotatability of the shaft (15' or 17'), wherein the shafts (15' or 17') are threaded shafts, onto which an internal thread of the respective restraining means (14, 16) is screwed.

5. The contour gauge according to claim 3, wherein the head (17") of the first restraining element (17) of the second restraining means has a material thickness, which corresponds to a depth of the wide region (9") of the second longitudinal slit (9) facing the first ruler and/or wherein the first ruler (7) and the second ruler (10) have the same width, which corresponds to a distance between the side walls (4) of the guide (3) and/or wherein one or several holding elements or protrusions (27), which engage at least over the edge of the second ruler (10), are arranged in a region of an open narrow side wall of the guide (3).

6. The contour gauge according to claim 3, wherein in the first stop position, the shaft (15") of the first restraining element of the first restraining means adjoins a closed end of the first longitudinal slit (6) and/or wherein in the second stop position, the shaft (17") of the first restraining element of the second restraining means adjoins a closed end of the second longitudinal slit (9) and/or wherein in the storage position, the two rulers (7, 10) lie completely in the guide (3).

7. The contour gauge according to claim 1, wherein the restraining means (14, 16) are formed by rotary handles, which each form a flat pressure surface, which faces the first ruler (7) or the second ruler (10), respectively, and which is configured to be pressed against an upwardly facing broadside surface of the first ruler (7) or of the second ruler (10), respectively, by means of a rotation of the restraining means (14, 16) about a thread axis, in order to clamp the first ruler (7) between the pressure surface and the bottom (5) and to clamp the second ruler (10) between pressure surface and upwardly facing broadside surface of the second ruler (7).

8. The contour gauge according to claim 1, further comprising a first pressure element (21) engaging with a first feeler fin (2) of the plurality of feeler fins and arranged on an edge of the plurality of feeler fins, a second pressure element (22) engaging with a second feeler fin (2) of the plurality of feeler fins arranged on a second edge of the plurality of feeler fins, and a clamping element (28, 29), by means of which a force directed at the plurality of feeler fins can be exerted on the first pressure element (21), wherein a distance of the first pressure element (21) with respect to the second pressure element (22) is adjustable by means of setting means (23, 24), wherein the setting means is formed by grub screws (24) and an internal thread (23') assigned to the housing (1), whereby the distance is adjustable by rotating the grub screws (24).

9. The contour gauge according to claim 8, wherein the pressure elements (21, 22) are pressure plates.

10. The contour gauge according to claim 1, comprising a stop (13) provided on a free end (12) of the ruler (10), wherein the ruler assembly is arranged in a back of the housing (1) facing away from a set-up side of the housing, wherein the stop (13) has a stop carrier (13'), which is connected to a free end (12) of the ruler (10) and forms a bearing surface, which runs transversely to the free end of the ruler (10) and adjoins a stop plate (13"), which is capable of being displaced in height in a direction of the set-up side with respect to the bearing surface of the stop carrier (13').

* * * * *